(12) United States Patent　　(10) Patent No.:　　US 12,583,191 B2
Yoshida et al.　　(45) Date of Patent:　　Mar. 24, 2026

(54) RESIN FORMED ARTICLE AND METHOD FOR PRODUCING RESIN FORMED ARTICLE

(71) Applicant: Showa Denko Materials Co., Ltd., Tokyo (JP)

(72) Inventors: Noriyuki Yoshida, Tokyo (JP); Yu Masuzawa, Tokyo (JP); Yoshihiro Tsuda, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 869 days.

(21) Appl. No.: 17/440,034

(22) PCT Filed: Mar. 23, 2020

(86) PCT No.: PCT/JP2020/012709

§ 371 (c)(1),
(2) Date: Sep. 16, 2021

(87) PCT Pub. No.: WO2020/196402

PCT Pub. Date: Oct. 1, 2020

(65) Prior Publication Data

US 2022/0184897 A1　　Jun. 16, 2022

(30) Foreign Application Priority Data

Mar. 27, 2019　(JP) ................................ 2019-060079

(51) Int. Cl.
*B29C 70/06*　　(2006.01)
*B29C 45/14*　　(2006.01)
*B29C 45/56*　　(2006.01)
*B29L 9/00*　　(2006.01)

(52) U.S. Cl.
CPC .......... *B29C 70/06* (2013.01); *B29C 45/1418* (2013.01); *B29C 45/14786* (2013.01); *B29C 45/56* (2013.01); *B29C 2045/14286* (2013.01); *B29L 2009/00* (2013.01)

(58) Field of Classification Search
None
See application file for complete search history.

(56) References Cited

U.S. PATENT DOCUMENTS

2006/0216469 A1* 9/2006 Hashizume ....... B29C 45/14221
428/119

FOREIGN PATENT DOCUMENTS

| DE | 102011120903 A1 | 6/2013 |
|---|---|---|
| DE | 102014113227 A1 | 3/2016 |
| DE | 102015208945 A1 | 11/2016 |
| DE | 102015208946 A1 | 11/2016 |
| JP | 2014-213602 A | 11/2014 |

* cited by examiner

*Primary Examiner* — Lynda Salvatore

(74) *Attorney, Agent, or Firm* — FITCH EVEN TABIN & FLANNERY, LLP

(57) ABSTRACT

A resin formed article, comprising a main body that includes a first resin; a functional layer that is disposed at at least a portion of a surface of the main body and includes a fiber and a second resin; and a projection that is disposed on the functional layer and includes the first resin and the second resin.

8 Claims, 1 Drawing Sheet

RESIN FORMED ARTICLE AND METHOD FOR PRODUCING RESIN FORMED ARTICLE

CROSS-REFERENCE TO RELATED APPLICATIONS

This application is a U.S. national phase application filed under 35 U.S.C. § 371 of International Application No. PCT/JP2020/012709, filed Mar. 23, 2020, designating the United States, which claims priority from Japanese Patent Application No. 2019-060079, filed Mar. 27, 2019, the entire contents of each of which are hereby incorporated herein by reference.

TECHNICAL FIELD

The invention relates to a resin formed article and a method for producing a resin formed article.

BACKGROUND ART

Vehicles driven by electricity, such as electric automobiles and hybrid automobiles, have batteries that are installed at a bottom of a car body. The batteries are electrically connected with a cable, and are contained in a battery case and installed in a car body. As a battery case, in addition to cases made of metal, cases made of resin has been studied in order to meet demands for weight reduction, improved fuel efficiency, corrosion resistance and the like, while also shielding the car body from electromagnetic waves generated by the batteries (see, for example, Patent Document 1).

Generally, a battery case made of resin has a projection that is disposed at a main body for the purpose of reinforcement. Further, the battery case has an electromagnetic wave-shielding sheet that is disposed at a surface of the main body for the purpose of shielding the battery case from electromagnetic waves generated by the batteries. Patent Document 1 describes a battery case having a configuration in which an electromagnetic wave-shielding sheet is disposed along a plate-like portion of a main body, and an edge of the electromagnetic wave-shielding sheet follows a side surface of a projection.

PRIOR ART DOCUMENT

Patent Document

[Patent Document 1] Japanese Patent Application Laid-Open No. 2014-213602

SUMMARY OF THE INVENTION

Problem to be Solved by the Invention

The battery case disclosed in Patent Document 1 has a limited degree of freedom of shaping, since it is necessary to embed a retainer inside the projection, or to shape or trim the electromagnetic wave-shielding sheet to conform to the shape of the projection, in order to precisely dispose the electromagnetic wave-shielding sheet along the projection.

In view of the aforementioned circumstances, the present invention aims to provide a resin formed article having an excellent degree of freedom of shaping, and a method of producing a resin formed article having an excellent degree of freedom of shaping.

The means for solving the problem includes the following embodiments.

<1>A resin formed article, comprising: a main body that includes a first resin; a functional layer that is disposed at at least a portion of a surface of the main body and includes a fiber and a second resin; and a projection that is disposed on the functional layer and includes the first resin and the second resin.

<2>The resin formed article according to <1>, wherein the first resin and the second resin each is a thermoplastic resin.

<3>The resin formed article according to <1>or <2>, wherein a melting temperature of the second resin is equal to or lower than a melting temperature of the first resin.

<4>A method for producing a resin formed article, the method comprising:
disposing a functional layer that includes a fiber and a second resin in a mold having a concave portion that corresponds to a projection of a resin formed article; and
supplying a first resin in a melted state to the mold, the second resin having a melting temperature that is equal to or lower than a melting temperature of the first resin.

<5>The method for producing a resin formed article according to <4>, wherein a portion of the second resin included in the functional layer is melted by contact with the first resin supplied to the mold.

<6>The method for producing a resin formed article according to <4>or <5>, further comprising pressurizing the first resin after the supplying the first resin to the mold.

Effect of the Invention

According to an embodiment of the present invention, a resin formed article having an excellent degree of freedom of shaping, and a method of producing a resin formed article having an excellent degree of freedom of shaping are provided.

EMBODIMENTS FOR IMPLEMENTING THE INVENTION

Figure 1:
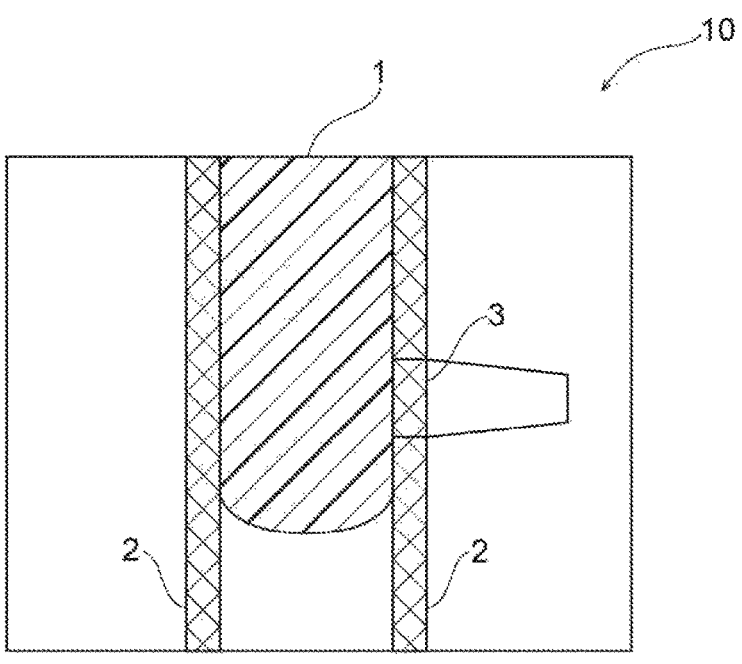
FIG. 1 is a sectional view schematically showing an example of a production process of the resin formed article.

Embodiments for implementing the invention will now be described in detail. However, the invention is in no way limited to the following embodiments. In the following embodiments, constituent elements (including element steps and the like) of the embodiments are not essential, unless otherwise specified. Likewise, numerical values and ranges thereof are not intended to restrict the invention.

In the present disclosure, the definition of the term "step" includes not only an independent step which is distinguishable from another step, but also a step which is not clearly distinguishable from another step, as long as the purpose of the step is achieved.

In the present disclosure, any numerical range described using the expression "to" represents a range in which numerical values described before and after the "to" are included in the range as a minimum value and a maximum value, respectively.

In a numerical range described in stages, in the present disclosure, an upper limit value or a lower limit value described in one numerical range may be replaced with an upper limit value or a lower limit value in another numerical range described in stages. Further, in a numerical range described in the present disclosure, the upper limit value or the lower limit value in the numerical range may be replaced with a value shown in the Examples.

Resin Formed Article

The resin formed article according to the present disclosure is a resin formed article, comprising: a main body that includes a first resin; a functional layer that is disposed at at least a portion of a surface of the main body and includes a fiber and a second resin; and a projection that is disposed on the functional layer and includes the first resin and the second resin.

The resin formed article according to the present disclosure has an excellent degree of freedom of shaping. The reasons for this are explained by referring to the drawings. The resin formed article according to the present disclosure is not limited to the configurations described in the drawings.

Figure 2:
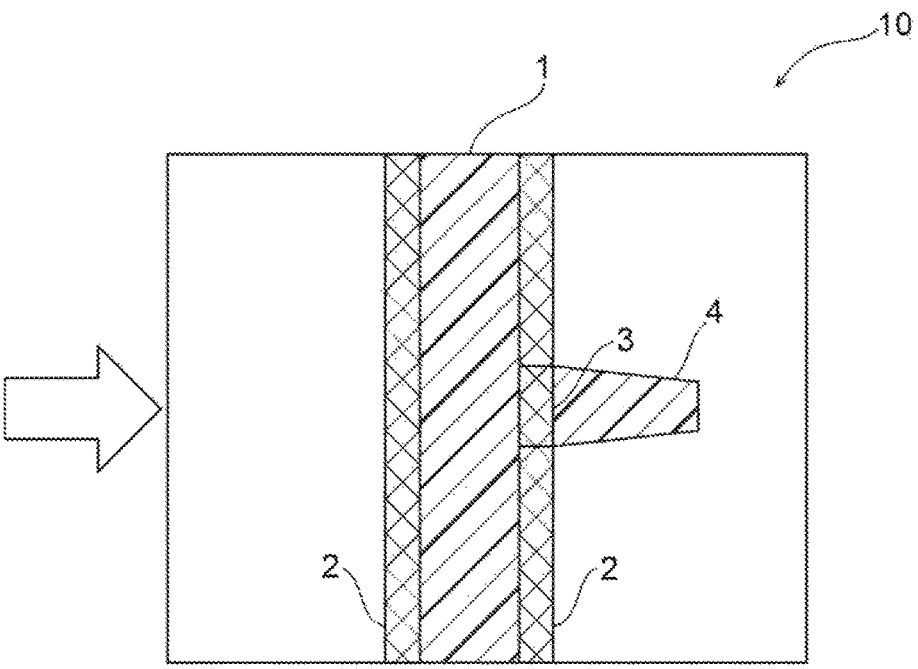
FIG. 2 is a sectional view schematically showing an example of a production process of the resin formed article.

FIG. 1 and FIG. 2 are sectional views schematically showing an example of a production process of the resin formed article.

In FIG. 1, a mold 10 has a space that corresponds to a main body of the resin formed article and a first resin 1 in a melted state is supplied thereto; and a concave portion having a shape corresponding to a projection of the resin formed article. Inside the mold 10, a functional layer 2 including a fiber and a second resin is disposed.

As shown in FIG. 1, a basal region 3, which corresponds to a basal portion of the projection, of the functional layer 2 is not in contact with the mold 10. Accordingly, the second resin included in the basal region 3 of the functional layer is difficult to be cooled by the mold 10, and is melted by contact with the first resin 1. As a result, the first resin 1 is capable of permeating through the fiber included in the basal region 3 of the functional layer 2.

Subsequently, as shown in FIG. 2, the mold 10 is operated such that the space to which the first resin 1 has been supplied is compressed. Accordingly, a portion of the first resin 1 that has been pressurized flows toward a concave portion of the mold 10 through the fiber in the basal region 3. Further, the second resin included in the basal region 3 of the functional layer 2 flows toward a concave portion of the mold 10. As a result, the concave portion is filled with the first resin and the second resin, thereby forming a projection 4. Through the process, the resin formed article according to the present disclosure is produced.

In the resin formed article according to the present disclosure, a projection is formed by a portion of the first resin, which forms a main body, flowing through the fiber included in the functional layer. Therefore, it is not necessary to perform a process such as hole making at a portion of the functional layer corresponding to the projection, and the resin formed article according to the present disclosure exhibits an excellent degree of freedom of shaping. Further, in the resin formed article according to the present disclosure, the main body and the projection are integrally formed via the functional layer. Therefore, the projection of the resin formed article according to the present disclosure exhibits an excellent strength, as compared with a projection that is prepared in a separate process and attached to the main body.

(Main Body)

The main body of the resin formed article includes a first resin. The type of the first resin is not particularly limited, and examples thereof include a thermoplastic resin. Examples of the thermoplastic resin includes polyolefin such as polyethylene or polypropylene, polyester such as polycarbonate, polyamide, polyvinyl chloride, polyurethane, and acrylic resin. The first resin may be selected depending on the purpose of the resin formed article. The first resin may be a single kind of resin, or may be a combination of two or more kinds.

The melting temperature of the first resin is not particularly limited, and may be selected depending on the production method of the resin formed article and the like. For example, the melting temperature may be selected from a range of 100° C. to 300° C.

As necessary, the main body may include a component other than the first resin. Examples of the component other than the first resin include an inorganic filler, a releasing agent, a fire retardant and a colorant.

From the viewpoint of improving the strength or adjusting the coefficient of thermal expansion of the resin formed article, the main body preferably includes an inorganic filler. Examples of the inorganic filler includes silica, alumina, talc, clay, mica, boron nitride and aluminum nitride. The shape of the inorganic filler is not particularly limited, and the inorganic filler may be in the form of fibers, particles, beads or the like.

When the main body includes an inorganic filler, the amount thereof is not particularly limited. From the viewpoint of an effect achieved by the inorganic filler and the flowability inside the mold, the amount of the inorganic filler may be from 1 part by mass to 5 parts by mass with respect to 100 parts by mass of the first resin.

The shape of the main body is not particularly limited, and may be selected depending on the purpose of the resin formed article. For example, the main body may have a plate-like shape or any other desired three-dimensional shape.

The thickness of the main body, at a portion at which the thickness is minimum, may be 1 mm or more, or may be 3 mm or more, or may be 5 mm or more.

(Functional Layer)

The functional layer includes a fiber and a second resin. The type of the second resin is not particularly limited. For example, the second resin may be selected from the exemplary resins for the first resin. The first resin and the second resin may be the same or different from each other. When the second resin is different from the first resin, the second resin is preferably selected from a resin that is compatible with the first resin. The second resin may be a single kind of resin, or may be a combination of two or more kinds.

As necessary, the functional layer may include a component other than the fiber and the second resin. Examples of the component other than the fiber and the second resin include an inorganic filler, a releasing agent, a fire retardant and a colorant.

The melting temperature of the second resin is not particularly limited, and may be selected depending on the production method for the resin formed article. For example, the melting temperature of the second resin may be selected from the same range as the range of the melting temperature of the first resin. Since the second resin needs to be melted by contact with the first resin, the melting temperature of the second resin is selected so as to be equal to or lower than the melting temperature of the first resin.

The fiber included in the functional layer may be an inorganic fiber or an organic fiber, and may be selected depending on the purpose of the resin formed article.

Examples of the inorganic fiber include a carbon fiber, a glass fiber and a ceramic fiber. Examples of the organic filer include an aramid fiber and a cellulose fiber. The functional layer may include a single kind of fiber, or may include two or more kinds. The fiber included in the functional layer may be in the form of a filament or a strand.

The proportion of the fiber in the functional layer is not particularly limited. For example, the proportion of the fiber in the total functional layer may be from 50% by mass to 85% by mass.

The state of the fiber in the functional layer is not particularly limited, as long as the first resin in a melted state can permeate though the functional layer. Examples of the state of the fiber include a state in which the fiber is unidirectionally oriented; a state in which the fiber is oriented in orthogonally-crossed two directions; and a state in which the fiber is randomly disposed without being oriented in particular directions. It is possible to create a state in which the first resin in a melted state can permeate the functional layer by, for example, controlling a size of an area among the fiber (i.e., an area filled with the resin) in the functional layer.

The thickness of the functional layer is not particularly limited, as long as the first resin in a melted state can permeate. For example, the thickness of the functional layer may be 2,000 μm or less, or may be 1,000 μm or less, or may be 500 μm or less. From the viewpoint of achieving a sufficient effect of the functional layer, the thickness of the functional layer may be 10 μm or more. The thickness of the functional layer may be constant or not constant. When the thickness of the functional layer is not constant, the thickness at least at a portion corresponding to a projection is selected from a thickness at which the first resin in a melted state can permeate.

The function that the functional layer imparts the resin formed article is not particularly limited, and examples thereof include reinforcement, electromagnetic wave-shielding, thermal insulation, antistatic properties and decoration.

(Projection)

The projection includes a first resin and a second resin. Namely, as described by referring to FIG. 1, the projection includes a portion of the first resin that fills a concave portion corresponding to the projection, and a portion of the second resin that is melted by contact with the first resin and fills a concave portion corresponding to the projection.

In the present disclosure, a projection that is prepared in a separate process from the same resin as the first resin and the second resin, and is subsequently attached to the functional layer, is not regarded as the projection according to the present disclosure.

Whether or not the projection includes a first resin and a second resin may be determined by a known process. For example, when the components of the main body, the functional layer and the projection of the resin formed article are analyzed, and a component that is in common with the main body (a first resin) and a component that is in common with the functional layer (a second resin) are included in the projection, respectively, it may be determined that the projection includes a first resin and a second resin.

As necessary, the projection may include a component other than the first resin and the second resin. Examples of the component other than the first resin and the second resin include an inorganic filler, a releasing agent, a fire retardant and a colorant.

The height of the projection (height of a portion rising from the functional layer) is not particularly limited, and may be selected depending on a desired function thereof or the like. For example, the height of the projection may be 0.5 mm or more, or may be 100 mm or less.

The thickness of the projection (thickness of a portion rising from the functional layer) is not particularly limited, and may be selected depending on a desired function thereof or the like. For example, the thickness of the projection may be 0.5 mm or more, or may be 100 mm or less.

The shape of the projection is not particularly limited, and may be selected depending on a desired function thereof or the like. For example, the projection may have a plate-like shape, a hollow cylindrical shape, a cylindrical shape, or any other desired three-dimensional shape. The projection may be a component generally referred to as a rib, a boss, a clip or the like, to be attached to the resin formed article.

The projection may have a shape satisfying a condition that a ratio of the thickness to the height (thickness/height) is 1.0 or less.

Method for Producing Resin Formed Article

The method for producing a resin formed article according to the present disclosure is a method that includes: disposing a functional layer that includes a fiber and a second resin in a mold having a concave portion that corresponds to a projection of a resin formed article; and supplying a first resin in a melted state to the mold, the second resin having a melting temperature that is equal to or lower than a melting temperature of the first resin.

In the method, the second resin, included in the functional layer, has a melting temperature that is equal to or lower than a melting temperature of the first resin. Therefore, a portion of the second resin in the functional layer (i.e., a second resin included in the basal region shown in FIG. 1) is melted by contact with the first resin in a melted state. As a result, it becomes possible for the first resin in a melted state to permeate through the fiber in the functional layer, and the first resin in a melted state flows toward a concave portion of the mold corresponding to a projection of the resin formed article. Along with the first resin, the second resin in a melted state flows toward a concave portion of the mold corresponding to a projection of the resin formed article.

From the viewpoint of facilitating the flowage of the first resin (and the second resin melted by contact with the first resin) toward a concave portion of the mold corresponding to a projection of the resin formed article, the method may include pressurizing the first resin after the supplying the first resin to the mold.

The method for pressurizing the first resin is not particularly limited, and may be performed by a method of pressuring a space inside the mold by operating the mold (injection compression molding), for example.

The resin formed article produced by the method may satisfy the conditions of the resin formed article, as described above.

As for the details and preferred examples of the resin formed article produced by the method and the materials thereof, the details and preferred examples of the resin formed article and the materials thereof as described above may be referred to.

The disclosure of Japanese Patent Application No. 2019-060079 is herein incorporated entirely by reference. All publications, patent applications, and technical standards mentioned in this specification are herein incorporated by reference to the same extent as if each individual publication, patent application, or technical standard was specifically and individually indicated to be incorporated by reference.

The invention claimed is:

1. A resin formed article, comprising:
   a main body that includes a first resin;
   a functional layer that is disposed at at least a portion of a surface of the main body and includes a fiber and a second resin; and
   a projection that is disposed on the functional layer and includes the first resin and the second resin,
   wherein a portion of the first resin is permeated into a portion of the functional layer, and wherein the projection does not include the fiber.

2. The resin formed article according to claim 1, wherein the first resin and the second resin each is a thermoplastic resin.

3. The resin formed article according to claim 1, wherein a melting temperature of the second resin is equal to or lower than a melting temperature of the first resin.

4. A method for producing a resin formed article, the method comprising:

disposing a functional layer that includes a fiber and a second resin in a mold having a concave portion that corresponds to a projection of a resin formed article; and
supplying a first resin in a melted state to the mold,
wherein the second resin has a melting temperature that is equal to or lower than a melting temperature of the first resin, and
wherein a portion of the first resin permeates into a portion of the functional layer, and wherein the projection does not include the fiber.

5. The method for producing a resin formed article according to claim 4, wherein a portion of the second resin included in the functional layer is melted by contact with the first resin supplied to the mold.

6. The method for producing a resin formed article according to claim 4, further comprising pressurizing the first resin after the supplying the first resin to the mold.

7. The method for producing a resin formed article according to claim 4, wherein the first resin permeates through the fiber included in a basal region of the functional layer corresponding to a basal portion of the projection.

8. The resin formed article according to claim 1, wherein the first resin is permeated through the fiber included in a basal region of the functional layer corresponding to a basal portion of the projection.

* * * * *